Nov. 13, 1956            N. J. SOLLOWAY            2,770,125
TWIST-GRIP CONTROLS FOR OPERATING BOWDEN CABLES
Filed May 1, 1952                                          2 Sheets-Sheet 1
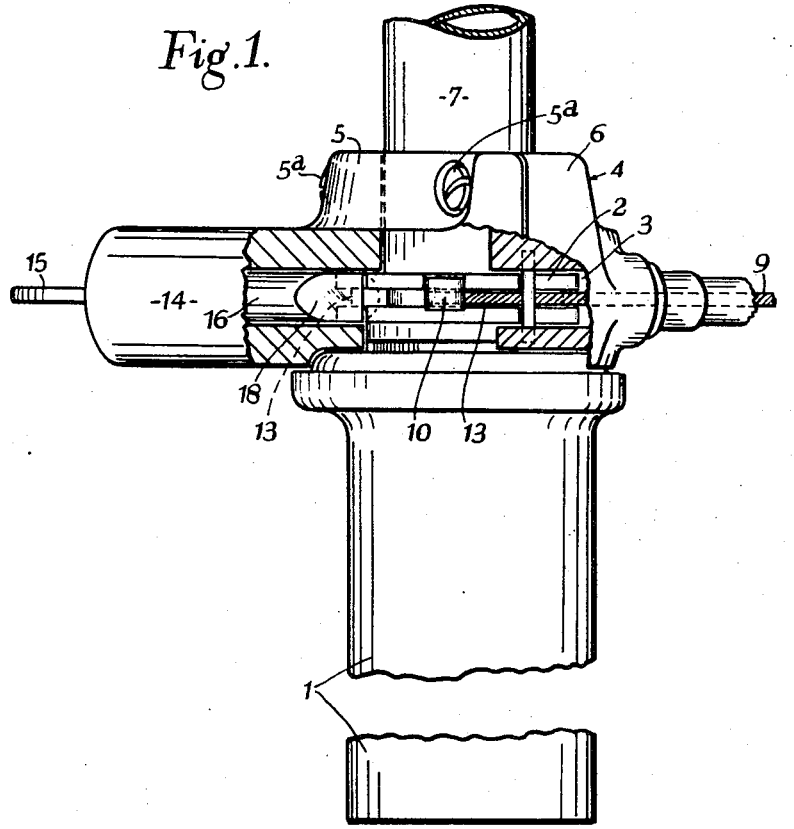
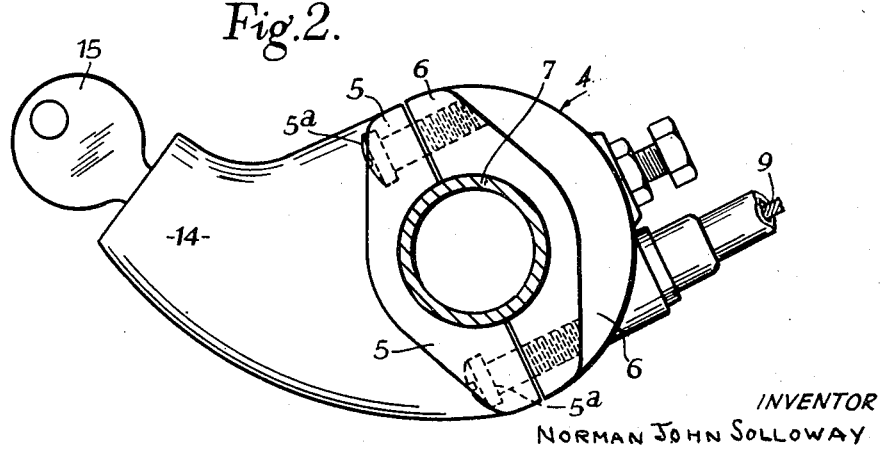
INVENTOR
NORMAN JOHN SOLLOWAY
BY
Richardson, David and Nordon
his ATTORNEYS

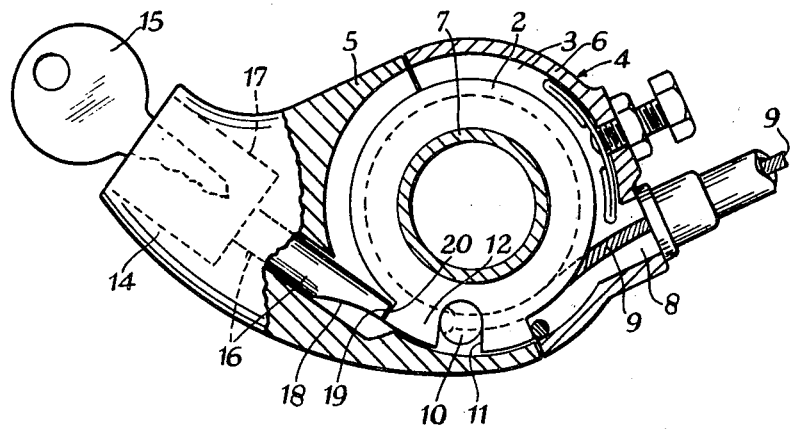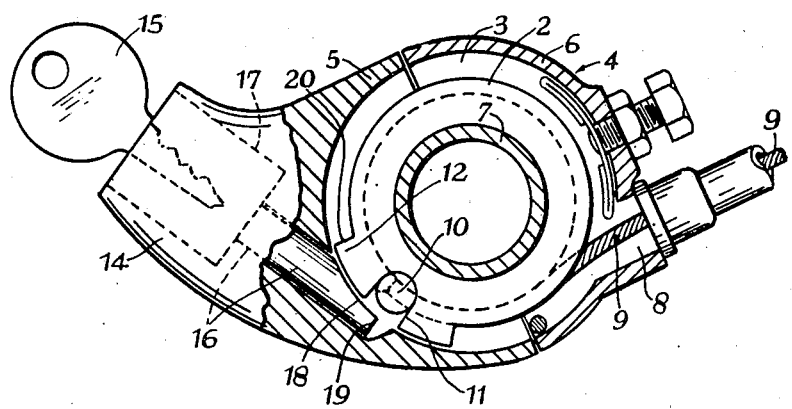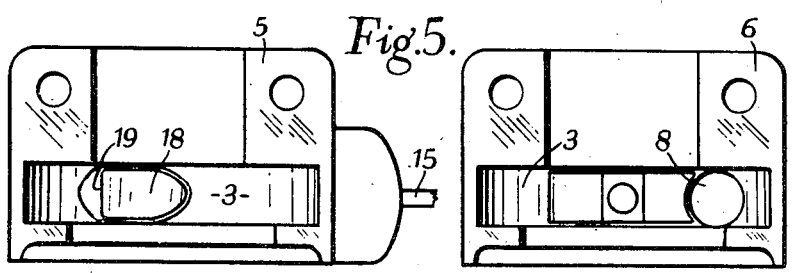

United States Patent Office 2,770,125
Patented Nov. 13, 1956

2,770,125
TWIST-GRIP CONTROLS FOR OPERATING BOWDEN CABLES

Norman John Solloway, Solihull, England, assignor to Feridax Limited, Birmingham, England, a registered British company Application May 1, 1952, Serial No. 285,565

3 Claims. (Cl. 70—185)

This invention relates to a twist grip control for operating a flexible cable, which is particularly, although not exclusively, adapted for use on a handle bar of a motorcycle for controlling a mechanism through the cable; a common example of this use is for controlling the throttle of the carburettor.

The invention relates to a twist grip control of the type comprising a handle which is relatively turnable about a fixable mounting, such as a divided clamp, adapted to be secured to handle bars, this mounting having an inlet for the cable, which is to be anchored by means of a nipple to the handle. A typical example of such a twist grip control comprises a tubular handle having a drum which turnably engages a divided clamp.

Motorcycles, unlike motor cars, are not normally provided with safety means which hinders or prevents the unauthorised operation of and taking away of the vehicle. As the equipment of most motorcycles includes a twist grip for controlling an essential part of the power unit, it would be most advantageous to provide simple and inexpensive means on the control for quickly rendering it ineffective when a machine is to be left unattended.

According to the present invention, a twist grip control of the kind referred to is furnished with a manually operable locking device arranged to lock the handle to the fixable mounting so as to prevent the turning of the handle and the normal operation of the cable.

According to a preferred embodiment of the invention, the locking device is provided on the fixable mounting, and includes a barrel-type lock with a bolt adapted, when turned into the locking position, to engage an abutment on the handle.

The term "key-operated" means an operation by a withdrawable key as applies to locks, and "normal operation of the cable" means tensioning the cable to effect movement of some part connected, or intended to be connected, to it.

The accompanying drawings illustrate an experimental construction of a twist grip control according to the invention, wherein:

Fig. 1 is a sectional plan of the twist grip control in position on a tube, the locking device being in the unlocked position.

Fig. 2 is an end view of Fig. 1.

Figs. 3 and 4 are sections of Fig. 1 showing respectively the key locked and unlocked positions of the handle.

Fig. 5 is an internal view of the sections of the divided clamp.

In the drawings, the twist grip control comprises a tubular handle or sleeve 1 which is relatively turnable about its axis and has a drum 2 engaging an annular groove 3 in a fixable mounting 4 consisting of a divided clamp 5, 6; the latter is normally clamped by screws 5a on a tubular member 7 which may be a handle bar of a motorcycle, motorised lawn mower or an immobile part. The clamp section 6 has an inlet 8 to receive a flexible cable 9, of the Bowden type, having a nipple 10 anchored in a recess 11 provided in a grooved flange 12 on the drum, the latter also being grooved at 13 to accommodate the cable. When the handle is turned in one direction, the cable 9 is wound on the drum 2 and its transmission is employed to operate a part at the other end of the cable, usually a throttle of a carburettor. This is normal practice in the art.

The section 5 of the clamp has a horn 14 containing a locking bolt 16 turned by a removable key 15. This locking device incorporates the general principles of the barrel type lock known under the registered trademark "Yale," which has spring loaded plungers (not shown) to be depressed by means of the key bit and the bolt 16 turnable with the barrel 17. This bolt 16 which is mainly cylindrical, has its inner end 18 milled into symmetry with the annular groove 3 which enables the drum 2 to turn freely in the groove 3 when the bolt 16 occupies the unlocked position as shown in Figs. 1 and 4, so that the turning of the handle 1 transmits the desired movement to the cable 9. When, for example, the rider of a motorcycle desires to leave his machine unattended and safe against unauthorised use, he turns the handle 1 into an inoperative or cable-inert position (if it has not been so restored by the cable mechanism which is usually spring loaded) and turns the barrel 17, by inserting the key 15 which is then removed. This simple operation brings the end 19 of the bolt 16 into engagement with an adjacent end 20 of the flange 12 on the drum 2, so that the latter is blocked by the bolt 16 should an attempt be made to turn the handle 1 for operating the cable. This arrangement of locking the handle is mainly applicable to a condition where the cable 9 is restrained against transmission, i. e. is virtually untensioned, but it does not exclude instances where a different condition may be met with where locking would be desirable or advantageous when the cable is tensioned so that locking could be arranged for in the extreme angular positions of the handle. To accomplish this, the periphery of the drum could be milled, drilled or otherwise machined at selected positions to be engaged by the end of the bolt.

I desire it to be understood that although the invention has been described in connection with a Yale type lock which is eminently suitable for the purpose, other known constructions of key operated locks or permutation locks could be employed and combined either with the flexible mounting 4.

I claim:

1. A twist grip control for operating a flexible cable comprising a tubular handle, a co-axial drum on said handle, said drum and said handle being adapted to be mounted for rotation as a unit on a support having the cross section of said tubular handle, said drum having a cable groove and a nipple anchorage, a divided clamp adapted to be secured to said support and having an annular groove in the bore thereof and in which said drum rotatably engages, a cable inlet in said clamp, and a key operated locking bolt rotatably mounted in said clamp, the inner end of said bolt extending into said annular groove and being adapted when turned into the locking position to co-operate with an abutment on said drum to lock said handle against rotary movement whereas in the unlocked position, the said inner end permits said handle to turn.

2. A twist grip control according to claim 1, in which the inner end of said rotary bolt is shaped symmetrically to match said annular groove so as to permit the rotation of the drum when said bolt is in the unlocked position.

3. A twist grip control for operating a flexible cable comprising, a tubular handle, a co-axial drum on said handle said drum and said handle being adapted to be mounted for rotation as a unit on a support having the cross section of said tubular handle, said drum having a cable groove and a nipple anchorage, a divided clamp adapted to be secured to said support and having an annular groove in the bore thereof and in which said drum rotatably engages, a cable inlet in said clamp, a horn projecting externally from said clamp, a key operated barrel type locking bolt rotatably mounted in said horn, the inner end of said bolt extending into said annular groove and being adapted when turned into the locking position to co-operate with an abutment on said drum to lock said handle against rotary movement whereas in the unlocked position, the said inner end permits said handle to turn.

References Cited in the file of this patent
UNITED STATES PATENTS

| | | |
|---|---|---|
| 1,551,505 | Martin | Aug. 25, 1925 |
| 1,604,225 | George | Oct. 26, 1926 |
| 1,653,187 | Levy | Dec. 20, 1927 |
| 2,129,575 | Gilman | Sept. 6, 1938 |